United States Patent
Yun et al.

(10) Patent No.: US 8,443,122 B2
(45) Date of Patent: May 14, 2013

(54) ASYNCHRONOUS UPSIZING CIRCUIT IN DATA PROCESSING SYSTEM

(75) Inventors: JaeGeun Yun, Hwaseong-si (KR); Junhyung Um, Seoul (KR); Woo-Cheol Kwon, Suwon-si (KR); Hyun-Joon Kang, Hwaseong-si (KR); Bub-chul Jeong, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 226 days.

(21) Appl. No.: 12/917,854

(22) Filed: Nov. 2, 2010

(65) Prior Publication Data

US 2011/0131350 A1    Jun. 2, 2011

(30) Foreign Application Priority Data

Dec. 1, 2009    (KR) ................... 10-2009-0117760

(51) Int. Cl.
 *G06F 3/00* (2006.01)
 *G06F 5/00* (2006.01)

(52) U.S. Cl.
 USPC ............................................. 710/52; 710/60

(58) Field of Classification Search ............ 710/52, 710/60
 See application file for complete search history.

(56) References Cited

U.S. PATENT DOCUMENTS

| 6,900,812 B1 * | 5/2005 | Morein ................ 345/540 |
| 7,519,728 B1 * | 4/2009 | Yeluri et al. ............ 709/234 |

FOREIGN PATENT DOCUMENTS

| JP | 2001-014270 | 1/2001 |
| JP | 2002-373146 | 12/2002 |
| KR | 1020070000941 | 1/2007 |

* cited by examiner

*Primary Examiner* — Idriss N Alrobaye
*Assistant Examiner* — Zachary K Huson
(74) *Attorney, Agent, or Firm* — F. Chau & Associates, LLC.

(57) ABSTRACT

An asynchronous upsizing circuit in a data processing system. The asynchronous upsizing circuit includes an asynchronous packer and an asynchronous unpacker. The asynchronous packer includes a write buffer commonly used for an asynchronous bridge and for upsizing and for buffering a write channel data; and first and second asynchronous packing controllers controlling channel compaction according to first and second clocks, respectively, regarding the write channel data inputted/outputted to/from the write buffer during a burst write operation. The asynchronous unpacker includes a read buffer commonly used for an asynchronous bridge and for upsizing and for buffering a read channel data; and first and second asynchronous unpacking controllers controlling channel compaction according to the first and second clocks, respectively, regarding the read channel data inputted/outputted to/from the read buffer during a burst read operation.

20 Claims, 10 Drawing Sheets

| WR depth | RD depth | Total buf bit Upsizer + Async | Total buf bit SPLA_Upsizer |
|---|---|---|---|
| 1 | 2 | 9773 (117K) | 5214 (63K) |
| 1 | 2.4 (166 to 200) | 10838 (130K) | 5715 (69K) |
| 1 | 3 | 12373 (149K) | 6438 (78K) |
| 1 | 4 | 14973 (180K) | 7662 (92K) |
| 1 | 5 | 17573 (211K) | 8886 (107K) |
| 1 | 6 | 20173 (243K) | 10110 (122K) |
| 1 | 7 | 22773 (274K) | 11334 (136K) |
| 1 | 8 | 25373 (305K) | 12558 (151K) |
| 1 | 9.64 (166 to 200) | 29633 (356K) | 14564 (175K) |

| MHz | ns | 33.3 | 66.7 | 100 | 133.3 | 166.7 | 200 | 300 | 333.3 | 400 | 533.3 |
|---|---|---|---|---|---|---|---|---|---|---|---|
| | | 30 | 15 | 10 | 7.5 | 6 | 5 | 3.3 | 3 | 2.5 | 1.9 |
| 33.3 | 30 | 1 | 0.5 | 0.33 | 0.25 | 0.2 | 0.17 | 0.11 | 0.1 | 0.08 | 0.06 |
| 66.7 | 15 | 2 | 1 | 0.67 | 0.5 | 0.4 | 0.33 | 0.22 | 0.2 | 0.17 | 0.13 |
| 100 | 10 | 3 | 1.5 | 1 | 0.75 | 0.6 | 0.5 | 0.33 | 0.3 | 0.25 | 0.19 |
| 133.3 | 7.5 | 4 | 2 | 1.33 | 1 | 0.8 | 0.67 | 0.44 | 0.4 | 0.33 | 0.25 |
| 166.7 | 6 | 5 | 2.5 | 1.67 | 1.25 | 1 | 0.83 | 0.56 | 0.5 | 0.42 | 0.31 |
| 200 | 5 | 6 | 3 | 2 | 1.5 | 1.2 | 1 | 0.67 | 0.6 | 0.5 | 0.38 |
| 300 | 3.3 | 9 | 4.5 | 3 | 2.25 | 1.8 | 1.5 | 1 | 0.9 | 0.75 | 0.56 |
| 333.3 | 3 | 10 | 5 | 3.33 | 2.5 | 2 | 1.67 | 1.11 | 1 | 0.83 | 0.63 |
| 400 | 2.5 | 12 | 6 | 4 | 3 | 2.4 | 2 | 1.33 | 1.2 | 1 | 0.75 |
| 533.3 | 1.9 | 16 | 8 | 5.33 | 4 | 3.2 | 2.67 | 1.78 | 1.6 | 1.33 | 1 |

Fig. 8

| AWLENs | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| AWLENm−1 | 0 | 1 | 1 | 1 | 2 | 2 | 3 | 3 | 4 | 4 | 5 | 5 | 6 | 6 | 7 | 8 |
| 0.50 | 1 | 1 | 1 | 2 | 2 | 3 | 3 | 4 | 4 | 5 | 5 | 6 | 6 | 7 | 7 | 8 |
| 0.56 | 1 | 2 | 2 | 2 | 4 | 4 | 5 | 6 | 7 | 8 | 8 | 9 | 10 | 11 | 11 | 12 |
| 0.60 | 1 | 2 | 2 | 2 | 3 | 4 | 5 | 5 | 6 | 7 | 8 | 9 | 9 | 10 | 11 | 11 |
| 0.67 | 1 | 2 | 2 | 2 | 3 | 4 | 5 | 5 | 6 | 7 | 8 | 9 | 10 | 10 | 11 | 11 |
| 0.83 | 1 | 2 | 2 | 2 | 3 | 3 | 4 | 4 | 5 | 6 | 7 | 8 | 8 | 9 | 10 | 10 |
| 0.90 | 1 | 2 | 2 | 2 | 3 | 3 | 4 | 4 | 5 | 6 | 6 | 7 | 8 | 9 | 10 | 10 |
| 1.00 | 1 | 2 | 2 | 2 | 3 | 3 | 4 | 4 | 5 | 5 | 6 | 7 | 7 | 8 | 9 | 9 |
| 1.11 | 1 | 1 | 1 | 1 | 2 | 2 | 3 | 3 | 4 | 5 | 5 | 6 | 6 | 7 | 8 | 8 |
| 1.20 | 1 | 1 | 1 | 1 | 2 | 2 | 3 | 3 | 4 | 4 | 5 | 6 | 6 | 6 | 7 | 7 |
| 1.50 | 1 | 1 | 1 | 1 | 2 | 2 | 2 | 3 | 3 | 4 | 4 | 4 | 5 | 5 | 5 | 6 |
| 1.67 | 1 | 1 | 1 | 1 | 1 | 1 | 1 | 2 | 2 | 3 | 3 | 3 | 3 | 4 | 4 | 4 |
| 1.80 | 1 | 1 | 1 | 1 | 1 | 1 | 1 | 2 | 2 | 2 | 3 | 3 | 3 | 3 | 3 | 3 |
| 2.00 | 1 | 1 | 1 | 1 | 1 | 1 | 1 | 2 | 2 | 2 | 2 | 2 | 2 | 2 | 2 | 2 |

*(Row AWLENm−1 = 1.00 is shaded/highlighted in the original figure.)*

ASYNCHRONOUS UPSIZING CIRCUIT IN DATA PROCESSING SYSTEM

CROSS-REFERENCE TO RELATED APPLICATIONS

This U.S. non-provisional patent application claims priority under 35 U.S.C. §119 of Korean Patent Application No. 10-2009-0117760, filed on Dec. 1, 2009, the entire contents of which are hereby incorporated by reference.

BACKGROUND

The present disclosure herein relates to a data processing system, and more particularly, to an asynchronous upsizing commonly having an async bridge function in mobile systems such as smart phones and navigation devices.

In mobile systems such as smart phones, personal navigation devices, portable Internet devices, portable broadcasting devices, or multimedia devices, high performance mobile application processors operating at a high frequency are being used on a System on Chip (hereinafter, referred to as "SoC") to support various applications.

Since the mobile application processors take charge of arithmetic operation and program command execution, the mobile application processors are essential elements that affect performance of a mobile SoC. The mobile application processors may include an on-chip secondary cache, called as an L2 (level 2) cache, to enable integration of various functions such as wireless communication, personal navigation, camera, portable gaming, portable music/video player, mobile TV, and Personal Digital Assistant (PDA). The addition of the L2 cache is a known method for increasing the performance of a mobile system when heavy memory traffic occurs due to a processor.

For effective design of the SoC, the selection of a bus system for mutual communication is one choice between a plurality of pre-designed Intellectual Properties (IPs) (purchased peripheral functional blocks) to be integrated on one chip. A typical example of known bus systems is an AMBA 3.0 Advanced eXetensible Interface (AXI) bus system based on AMBA protocol from Advanced RISC Machine (ARM) Inc.

Because of constraints such as development time and manpower, peripheral functional blocks such as Direct Memory Access Controller (DMAC), Universal Serial Bus (USB), Peripheral Component Interconnection (PCI), Static Memory Controller (SMC), and Smart Card Interface (SCI) that are parts of SoC may be purchased as IPs from the outside vendors. The purchased peripheral functional block IPs are integrated on a chip along with Central Processing Unit (CPU) and data processing functional blocks to constitute the SoC.

With an increase in consumer demand for high performance of mobile application processors, the operating frequency of a CPU and a cache controller in a SoC has reached several gigahertz (GHz). By contrast, the frequency of the bus system has not increased to several GHz. Instead, a data bus width wider than that of the CPU is employed to reduce the data transmission rate (frequency). For example, when the data bus width of a CPU having an operating frequency of about 1 GHz is 64-bit, the operating frequency of the bus system may be designed to have an operating frequency of about 200 MHz and a data bus width of about 128-bit.

Accordingly, in order to adjust the data transmission rate, an 64-bit data to 128-bit data upsizer circuit may be provided between a Central Processing Unit (CPU connectable to a cache controller and having a 64-bit data bus width and a 1 GHz operating frequency) and a bus system having a 128-bit data bus width and a 200 MHz operating frequency (transmission rate).

An asynchronous bridge ("async bridge") is widely used due to an increase of the size of a SoC design, and a 128-bit AXI bus has been introduced due to an increase of the bandwidth demand and thus the performance of the upsizer and the async bridge is recognized as an important factor. Both an async bridge and an upsizer are needed for the display IP path. Analysis of traffic patterns of such display IPs often results in successive burst read requests.

When read requests are successively shown in a display subsystem in which the display IPs are gathered, a 'read ready' signal may not be maintained high due to a bandwidth difference by the async bridge and the upsizer. In such a case, the operation of a memory controller may be stopped which affects the performance of the whole system. Accordingly, in order to minimize the degradation of performance, the 'read ready' signal provided to the memory controller has to be maintained high. In this case, since both of the async bridge and the upsizer require buffers, a gate (e.g., transistor) count overhead may be increased.

Also, when compaction is performed on a write address channel and a write data channel to increase bus utility in the case of a burst write, more efficient compaction schemes are required. For example, when the async bridge and the upsizer are individual and separated from each other, the efficiency of the channel compaction may be reduced, resulting in degradation of the latency and the bus utility.

Therefore, more efficient channel compaction technologies are required to reduce the gate count overhead in an async bridge and an upsizer applicable to a mobile system.

SUMMARY OF THE INVENTIVE CONCEPT

The present disclosure provides an asynchronous upsizing circuit that can improve performance of a data processing system.

The present disclosure also provides an asynchronous upsizing circuit that can reduce a gate count overhead.

The present disclosure also provides an upsizing circuit having an async bridge function.

The present disclosure also provides an asynchronous upsizing circuit and an asynchronous upsizing method that can perform channel compaction more efficiently.

The present disclosure also provides an upsizing circuit and a data processing system using the upsizing circuit that can reduce an occupied area of a circuit and improve latency and bus utility during a burst write operation.

An aspect of the inventive concept provides an asynchronous upsizing circuit in a data processing system comprising: an asynchronous packer including: a write buffer used for an asynchronous bridge and for upsizing and for buffering a write channel data; and first and second asynchronous packing controllers controlling channel compaction according to first and second clocks, respectively, regarding the write channel data inputted/outputted to/from the write buffer during a burst write operation; and further comprising an asynchronous unpacker including: a read buffer used for an asynchronous bridge and for upsizing and for buffering a read channel data; and first and second asynchronous unpacking controllers controlling channel compaction according to the first and second clocks, respectively, regarding the read channel data inputted/outputted to/from the read buffer during a burst read operation.

In some embodiments, the write buffer may include memories assigned to a write address channel, a write data channel, and a write response channel, respectively. The read buffer may include memories assigned to a read address channel and a read data channel, respectively.

The first clock may be a bus-master clock, and the second clock may be a bus-slave clock. The second clock may be an Advanced eXetensible Interface (AXI) bus clock.

In still other embodiments, when the frequency of the first clock is higher than the frequency of the second clock, a request of the write address channel may be advanced by a predetermined number of clock cycles during the burst write operation to perform a latency-optimized upsizing. Also, when the frequency of the first clock is lower than the frequency of the second clock, a request of the write address channel may be delayed by a predetermined number of clock cycles during the burst write operation to perform a bus utility-optimized upsizing.

In other embodiments, the memories may be First-In First-Out (FIFO) memories, respectively. Also, the bus-master clock may be a clock provided from a memory controller.

In yet other embodiments, the asynchronous packer may perform an asynchronous packing on the write channel data, and the asynchronous unpacker may perform an asynchronous unpacking on the read channel data.

Another aspect of the inventive concept provides an asynchronous upsizing circuit in a data processing system comprising: an asynchronous packer including first, second and third asynchronous memories commonly used for an asynchronous bridge and for upsizing and for buffering a write channel data and first and second asynchronous packing controllers controlling channel compaction according to a master clock and a slave clock, respectively, regarding the write channel data inputted/outputted to/from the first to third asynchronous memories during a burst write operation; and an asynchronous unpacker including fourth and fifth asynchronous memories commonly used for an asynchronous bridge and for upsizing and for buffering a read channel data and first and second asynchronous unpacking controllers controlling channel compaction according to the master clock and the slave clock, respectively, regarding the read channel data inputted/outputted to/from the fourth and fifth asynchronous memories during a burst read operation.

In some embodiments, the master clock may be a CPU clock, and the slave clock may be an AXI bus clock.

In other embodiments, the first asynchronous memory, the second asynchronous memory, and the third asynchronous memory may be assigned to a write address channel, a write data channel, and a write response channel, respectively. Also, the fourth asynchronous memory and the fifth asynchronous memory may be assigned to a read address channel and a write data channel, respectively.

In still other embodiments, when the frequency of the master clock is higher than the frequency of the slave clock, a request of the write address channel may be advanced by a predetermined number of clock cycles during the burst write operation to perform a latency-optimized upsizing.

In even other embodiments, when the frequency of the master clock is lower than the frequency of the slave clock, a request of the write address channel may be delayed by a predetermined number of clock cycles during the burst write operation to perform a bus utility-optimized upsizing.

Other aspects of the inventive concept provide a data processing system comprising: a Central Processing Unit (CPU) connected to an Level2 (L2) cache controller; an asynchronous upsizing circuit connected between the CPU and an interface bus via the L2 cache controller and including an asynchronous packer including a write buffer commonly used for an asynchronous bridge and for upsizing and for buffering a write channel data; and first and second asynchronous packing controllers controlling channel compaction according to first and second clocks, respectively, regarding the write channel data inputted/outputted to/from the write buffer during a burst write operation; and an asynchronous unpacker including a read buffer commonly used for an asynchronous bridge and for upsizing and for buffering a read channel data; and first and second asynchronous unpacking controllers controlling channel compaction according to the first and second clocks, respectively, regarding the read channel data inputted/outputted to/from the read buffer during a burst read operation; and display Intellectual Properties (IPs) connected to the interface bus.

In some embodiments, the display IPs may be IPs for a mobile system.

Another aspect of the inventive concept provides asynchronous packing methods in a data processing system including a write buffer commonly used for an asynchronous bridge and for upsizing and for buffering a write channel data and first and second asynchronous packing controllers controlling channel compaction according to a master clock and a slave clock, respectively, regarding the write channel data inputted/outputted to/from the write buffer during a burst write operation. The asynchronous packing methods include: advancing a request of a write address channel by a predetermined number of clock cycles during the burst write operation while the frequency of the master clock is higher than the frequency of the slave clock; and delaying the request of the write address channel by a predetermined number of clock cycles during the burst write operation while the frequency of the master clock is lower than the frequency of the slave clock.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

In the present disclosure, when certain elements or lines are referred to as being connected to target element blocks, they can be directly connected to the target element blocks or can be indirectly connected to the target element blocks via other elements.

Equal or similar reference symbols provided in different drawings indicate equal or similar components. In some drawings, sizes of elements and lines may be exaggerated for effective explanation of technical contents.

It will be noted that each embodiment described and illustrated herein includes complementary embodiments thereof.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF EXEMPLARY EMBODIMENTS

Figure 1:
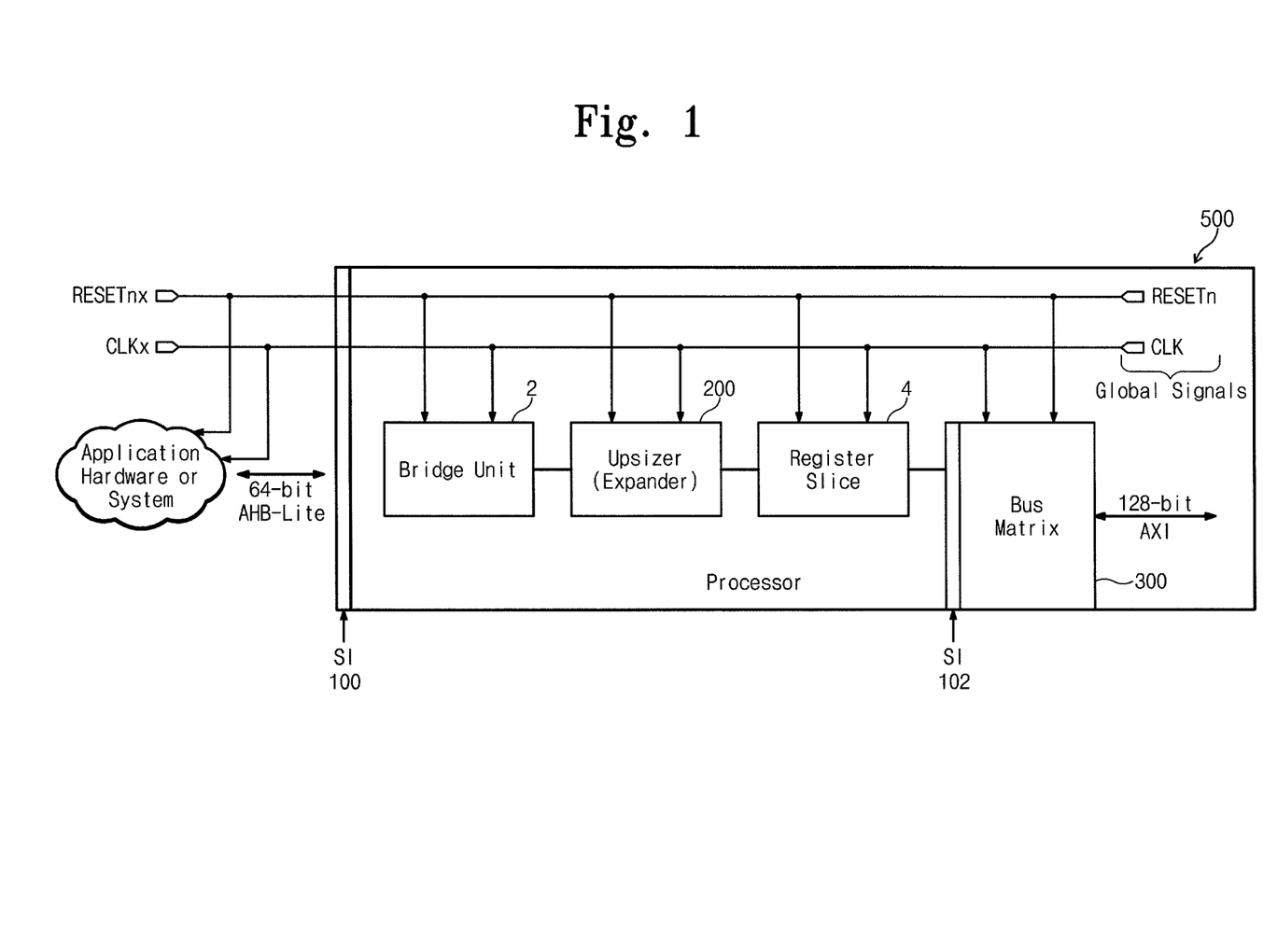
FIG. 1 is a block diagram of an asynchronous upsizing circuit 500 in a data processing system (e.g., a System on Chip (SoC)) including a high performance bus matrix, according to an exemplary embodiment of the inventive concept.

FIG. 1 is a block diagram of an asynchronous upsizing circuit 500 of a System on Chip (SoC) using a PrimCell High Performance Matrix (HPM) from Advanced RISC Machine (ARM) Inc., according to an embodiment of the inventive concept.

Referring to FIG. 1, an exemplary connection of interface support components on a Slave Interface (SI) is shown including a bridge unit 2, an upsizer 200, a register slice 4, and a bus matrix 300. The bridge unit 2 serving as an element for frequency conversion may cross between two asynchronous clock domains. The upsizer 200 may be a data bus width conversion element enabling a master side to connect to a slave side with a larger data width. The register slice 4 may be a buffering element for storing Advanced Microcontroller Bus Architecture (AMBA) Advanced eXetensible Interface (AXI) signals.

In FIG. 1, the upsizer 200 may primarily perform the function of a data expander for expanding, for example, 64-bit data to 128-bit data in order to reduce the transmission rate. In FIG. 1, the Slave Interface (SI) 100 connected to the bridge unit 2 may be connected to a Central Processing Unit (CPU) (e.g., having an application processor, not shown) side having a bus width of about 64-bit data and an operating frequency of about 1 GHz, and the bus matrix 300 may be a bus system having a bus width of about 128-bit data and an operating frequency of about 200 MHz. The bus matrix 300 may have a multi layer bus matrix structure. MI (102) represents a master interface at the bus matrix 300.

Figure 2:
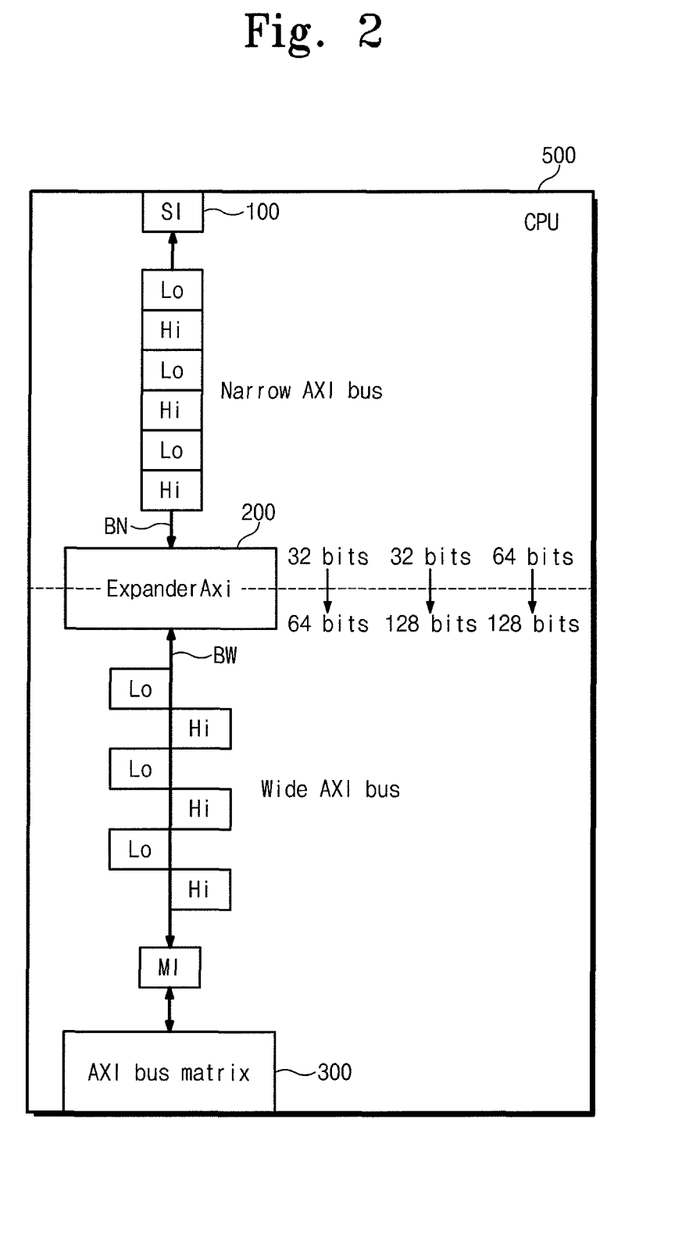
FIG. 2 is a block diagram and timing diagram illustrating the expansion of data in the asynchronous upsizing circuit 500 of FIG. 1 in a data processing system.

FIG. 2 is a block diagram and timing diagram illustrating the expansion of data in the asynchronous upsizing circuit 500 of FIG. 1 in a data processing system.

Referring to FIG. 2, a data processing system may include a narrow AXI bus before the upsizer 200 and a wide AXI bus behind the upsizer 200. The upsizer 200 expands 32-bit, 32-bit, and 64-bit data applied to a narrow bus line BN into 64-bit, 128-bit, and 128-bit data, respectively, to provide the expanded data to a wide bus line BW. Lo refers to the least significant bits, and Hi may refer to the most significant bits. For example, in total 128-bit data, 0 to 63 bits may correspond to Lo, and 64 to 127 bits may correspond to Hi. In FIG. 2, the Slave Interface (SI) 100 connected to the bridge unit 2 may be connected to a Central Processing Unit (CPU) side having a bus width of about 64-bit data and an operating frequency of about 1 GHz, and the AXI bus matrix 300 may be a bus system having a bus width of about 128-bit data and an operating frequency of about 200 MHz.

Figure 3:
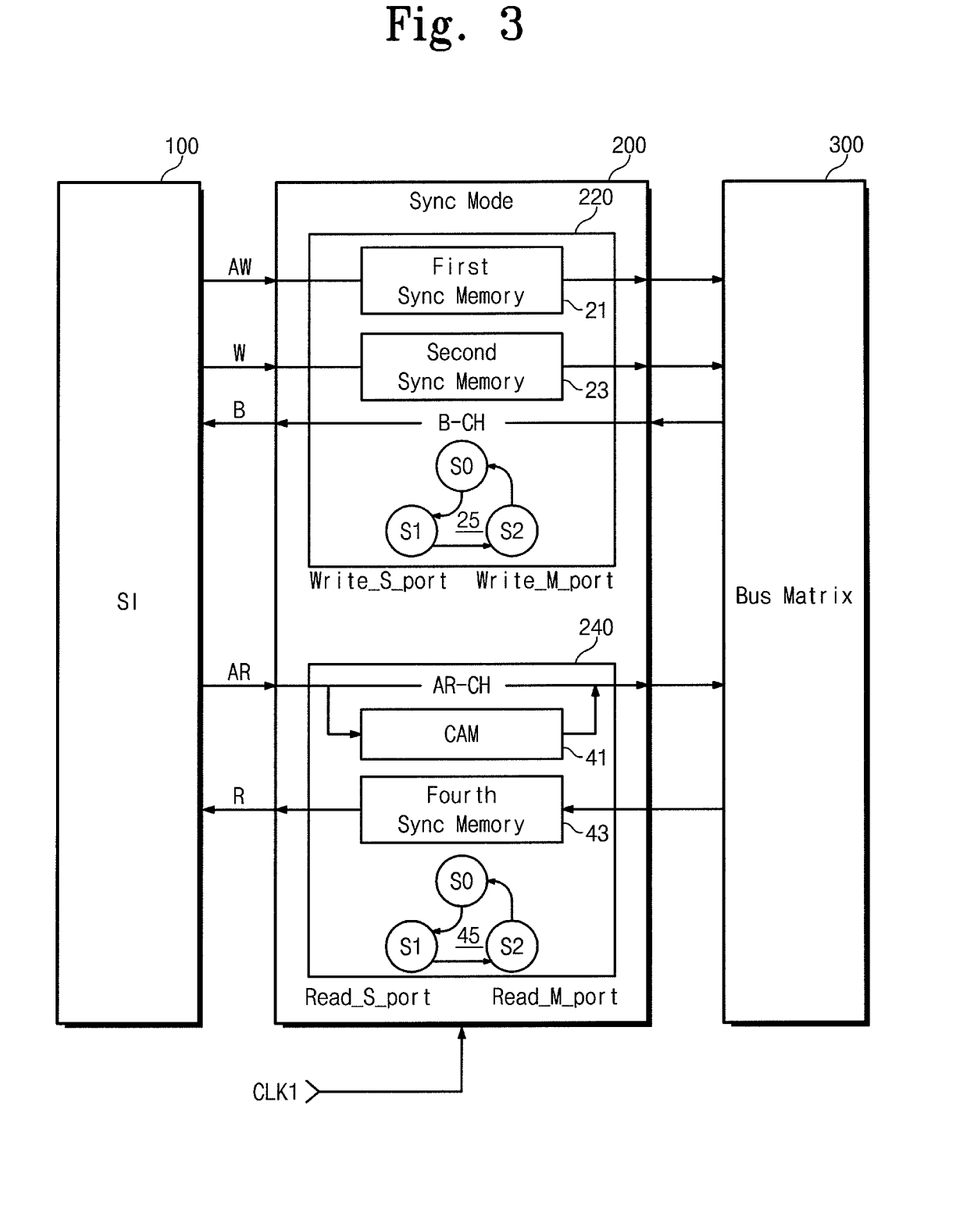
FIG. 3 is a detailed block diagram of a synchronous upsizer 200 for the asynchronous upsizing circuit 500 of FIG. 1.

FIG. 3 is a detailed block diagram illustrating a synchronous upsizer 200 in the asynchronous upsizing circuit 500 of FIG. 1.

In FIG. 3, the upsizer 200 operates in a synchronous mode and includes a sync packer 220 and a sync unpacker 240 that are operated according to a processor clock CLK1. The sync unpacker 220 includes first and second sync memories 21 and 23 and a sync packing controller 25. The sync unpacker 240 includes CAM 41, a third sync memory 43, and a sync unpacking controller 45. The sync packer 220 performs sync packing on a write address channel, a write data channel, and a write response channel. The sync unpacker 240 performs sync unpacking on a read address channel and a read data channel.

The first sync memory 21 stores an address of the write address channel in response to the control of the sync packing controller 25, and upsize the stored address to output the upsized address to a bus matrix 300.

The second sync memory 23 stores data of the write data channel in response to the control of the sync packing controller 25, and upsizes the stored data to output the upsized data to the bus matrix 300. Here, stored 64-bit data is upsized and applied to the bus matrix 300 as 128-bit data.

The CAM 41 is a memory that performs the function of an Address Read Content Addressable Memory (ARCAM).

The third sync memory 41 stores data of the read address channel in response to the control of the sync unpacking controller 45, and performs a bit conversion on the stored data to output the converted data to the slave interface (SI) 100.

The first to third sync memories 21, 23 and 43 may be implemented using First-In First-Out (FIFO) memories having a first-in first-out function.

In FIG. 3, a clock CLK1 applied to the upsizer 200 may be operated under the clock domain of the processor. Accordingly, when the processor clock has a frequency of about 1 GHz, the clock CLK1 may also be given with a frequency of about 1 GHz. On the other hand, the bus clock used in the bus matrix 300 may have a frequency of about 200 MHz.

The processor (or CPU) clock may be a Dynamic Voltage Frequency Scaling (DVFS) clock controlled by a Dynamic Voltage Frequency Scaling Controller (DVFSC) that has been used to minimize the current consumption of a SoC. The clock frequency may be dynamically controlled by the DVFSC.

In FIG. 3, AW represents write address channel signals, W represents write data channel signals, B represents write response channel signals, AR represents read address channel signals, and R represents read data channel signals. Also, SI represents a slave interface 100, and MI represents a master interface.

Since the upsizer 200 as shown in FIG. 3 is operated in a synchronous mode, it may be adapted to operate with the async bridge without increasing of the size of the SoC design.

Figure 4:
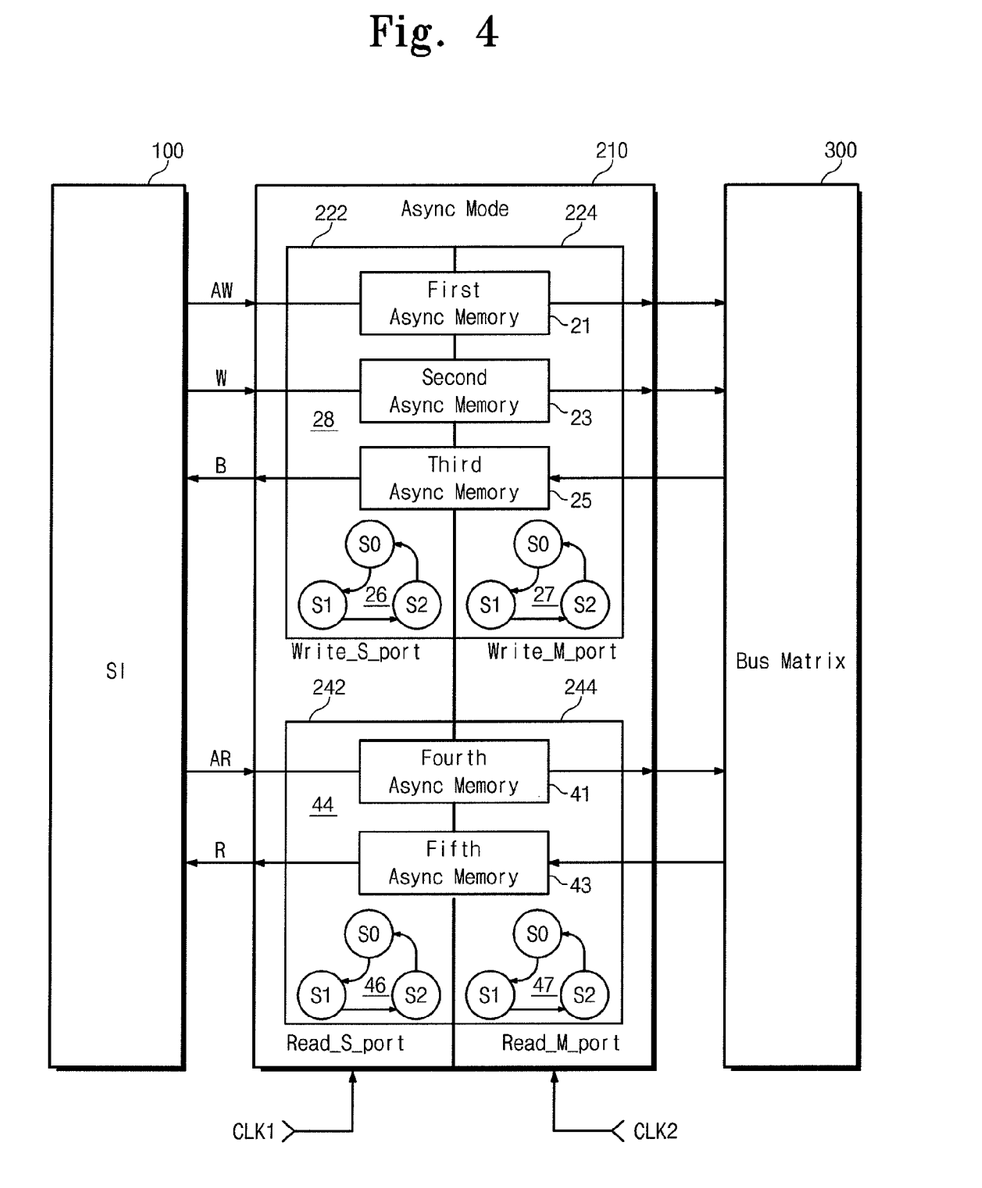
FIG. 4 is a detailed block diagram of an asynchronous upsizer 210 for the asynchronous upsizing circuit 500 of FIG. 1 according to an exemplary embodiment of the inventive concept.

In a display IP path where an async upsizer and an async bridge are frequently used, operation performance is important. If a 'read ready' signal is not maintained high due to a bandwidth difference between an async bridge and an upsizer in a display subsystem, the operation of a memory controller may be stopped which adversely affects the performance of the whole system. Accordingly, in order to minimize the degradation of the performance, the 'read ready' signal provided to the memory controller has to be maintained high. In this case, since both of the async bridge and the upsizer require buffers, a gate count overhead may be incurred. As shown in FIG. 4, an asynchronous upsizer 210 (having an asynchronous mode of operation) may be implemented and reduces the gate count overhead by sharing a write buffer and a read buffer.

Figure 9:
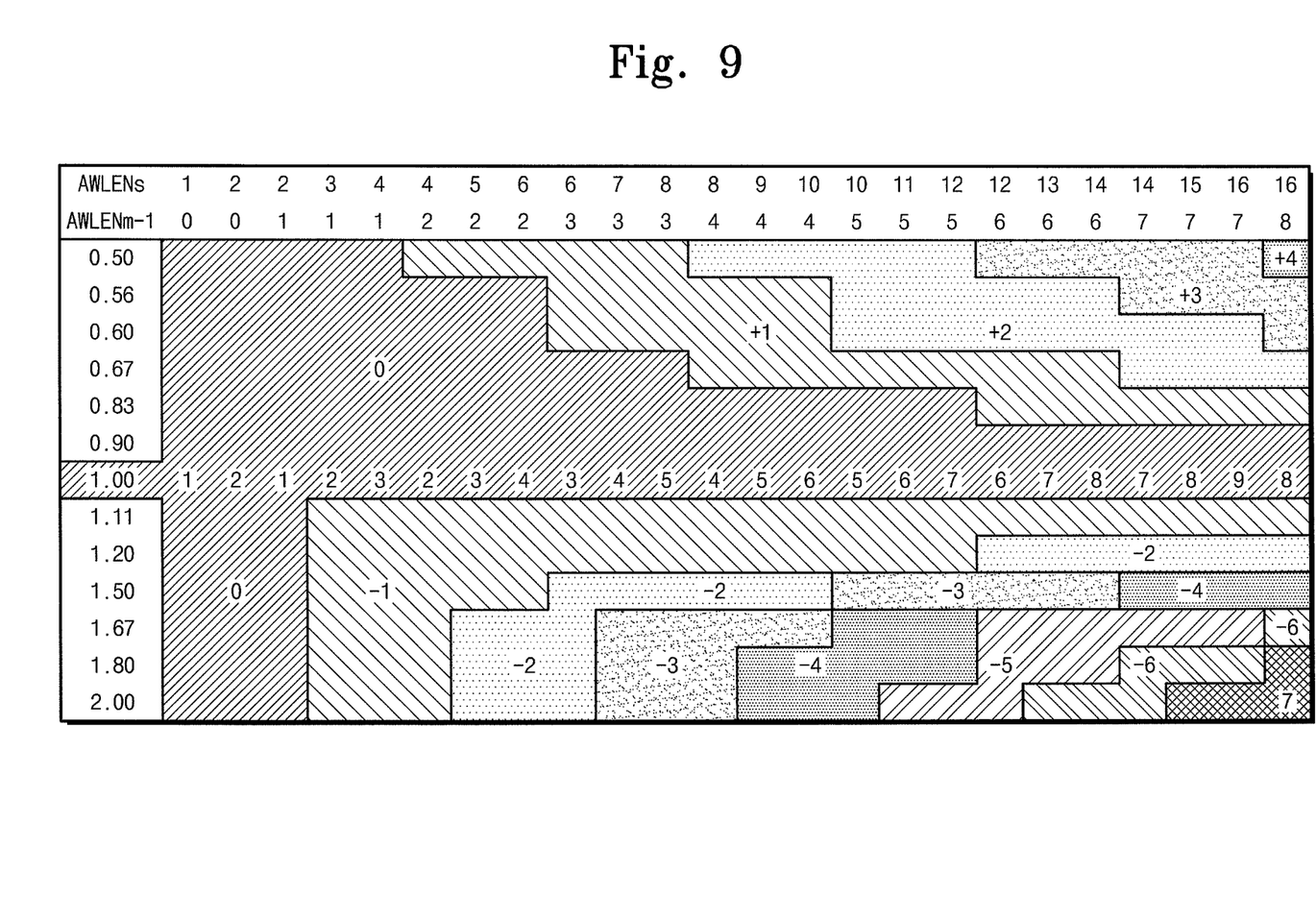
FIG. 9 is a graph mapping the distribution of fluctuation of clocks in the table of FIG. 8.

When a channel compaction is performed in a burst write operation, as shown in FIG. 9, the channel compaction may be controlled according to an operation clock adjustment table regarding the burst length and the clock ratio between a master and a slave to improve latency or bus utility and increase the channel compaction efficiency.

FIG. 4 is a detailed block diagram illustrating asynchronous upsizer 210 for the asynchronous upsizing circuit 500 of FIG. 1 according to an exemplary embodiment of the inventive concept.

The async (i.e., asynchronous) upsizer 210 includes first and second async packers 222 and 224 and first and second async unpackers 242 and 244.

The first and second async packer 222 and 224 are commonly used for an async bridge and for upsizing, and share first to third asynchronous memories 21, 23 and 25 that buffer write channel data AW, W and B. The first asynchronous packer 222 includes a first asynchronous packing controller 26 that controls channel compaction according to a master clock CLK1, regarding the write channel data inputted/outputted to/from the first to third asynchronous memories 21, 23 and 25 during a burst write. The second asynchronous packer 224 includes a second asynchronous packing controller 27 that controls channel compaction according to a slave clock CLK2, regarding the write channel data inputted/outputted to/from the first to third asynchronous memories 21, 23 and 25 during a burst write.

The first and second async unpacker 242 and 244 are commonly used for an async bridge and for upsizing, and share fourth and fifth asynchronous memories 41 and 43 that buffer read channel data AR and R. The first asynchronous unpacker 242 includes a first asynchronous unpacking controller 46 that controls channel compaction according to the master clock CLK1, regarding the read channel data inputted/outputted to/from the fourth and fifth asynchronous memories 41 and 43 during a burst read. The second asynchronous unpacker 244 includes a second asynchronous unpacking controller 47 that controls channel compaction according to the slave clock CLK2, regarding the read channel data inputted/outputted to/from the fourth and fifth asynchronous memories 41 and 43 during a burst read.

The first to third asynchronous memories 21, 23 and 25 can be implemented as FIFO memories and may be included in a write buffer 28. The fourth and fifth asynchronous memories 41 and 43 can be implemented as FIFO memories and may be included in a read buffer 44.

The master clock CLK1 may be a clock provided from a memory controller or the clock of the CPU (not shown). The slave clock CLK2 may be an AXI bus clock.

The first asynchronous memory 21 stores the address of a write address channel AW in response to the control of the first asynchronous packing controller 26. The first asynchronous memory 21 performs asynchronous bridging and upsizing on the stored address of the write address channel AW in response to the control of the second asynchronous packing controller 27 to output the upsized address to a bus matrix 300.

The second asynchronous memory 23 stores data of a write data channel W in response to the control of the first asynchronous packing controller 26. The second asynchronous memory 23 performs asynchronous bridging and upsizing on the stored data of the write address channel W in response to the control the second asynchronous packing controller 27 to output the upsized data to the bus matrix 300.

The third asynchronous memory 25 stores data of a write response channel B in response to the control of the second asynchronous packing controller 27. The third asynchronous memory 25 performs asynchronous bridging and bit width conversion on the stored data of the write response channel B in response to the control of the first asynchronous packing controller 26 to output the converted data to the slave interface 100.

The fourth asynchronous memory 41 stores the address of a read address channel AR in response to the control of the first asynchronous unpacking controller 46. The fourth asynchronous memory 41 performs asynchronous bridging and upsizing on the stored address of the read address channel AR in response to the control of the second asynchronous unpacking controller 47 to output the upsized address to the bus matrix 300.

The fifth asynchronous memory 43 stores data of a read response channel R in response to the control of the second asynchronous unpacking controller 47. The fifth asynchronous memory 43 performs asynchronous bridging and bit width conversion on the stored data of the read response channel R in response to the control of the first asynchronous unpacking controller 46 to output the converted data to the slave interface 100.

In the asynchronous upsizer 210 shown in FIG. 4, the write buffer 28 and the read buffer 44 may be shared to reduce a gate count overhead.

Figure 5:
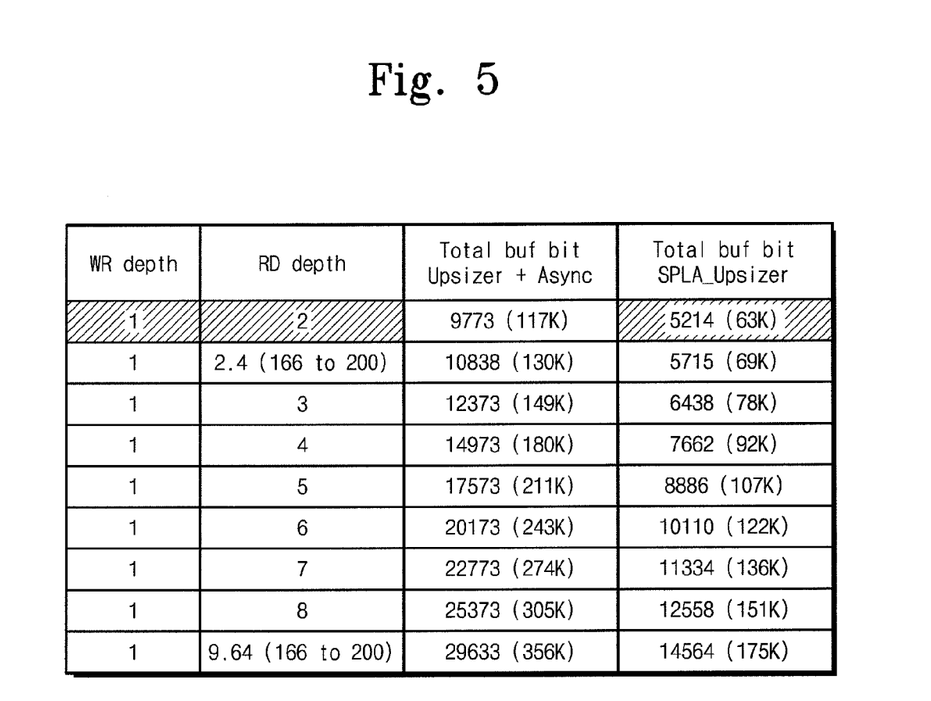
FIG. 5 is a table of gate counts showing a reduction of gate counts according to an exemplary embodiment of the inventive concept.

FIG. 5 is a table of gate counts showing a reduction according to an exemplary embodiment of the inventive concept. In the first row of the table of FIG. 5, 5214 (63K) is shown as the gate count in the asynchronous upsizer 210 of FIG. 4 for the asynchronous upsizing circuit 500 of FIG. 1. It will be understood that the gate count 5214 (63K) with the asynchronous upsizer 210 of FIG. 4 is reduced by about 47% compared to the gate count 9773 (117K) with the synchronous upsizer 200 of FIG. 3. Also, in the second row of the table of FIG. 5, the gate count is reduced from 10838 to 5715. Thus, the gate count can be significantly reduced by the sharing the write buffer 28 and the read buffer 44.

Figure 6:
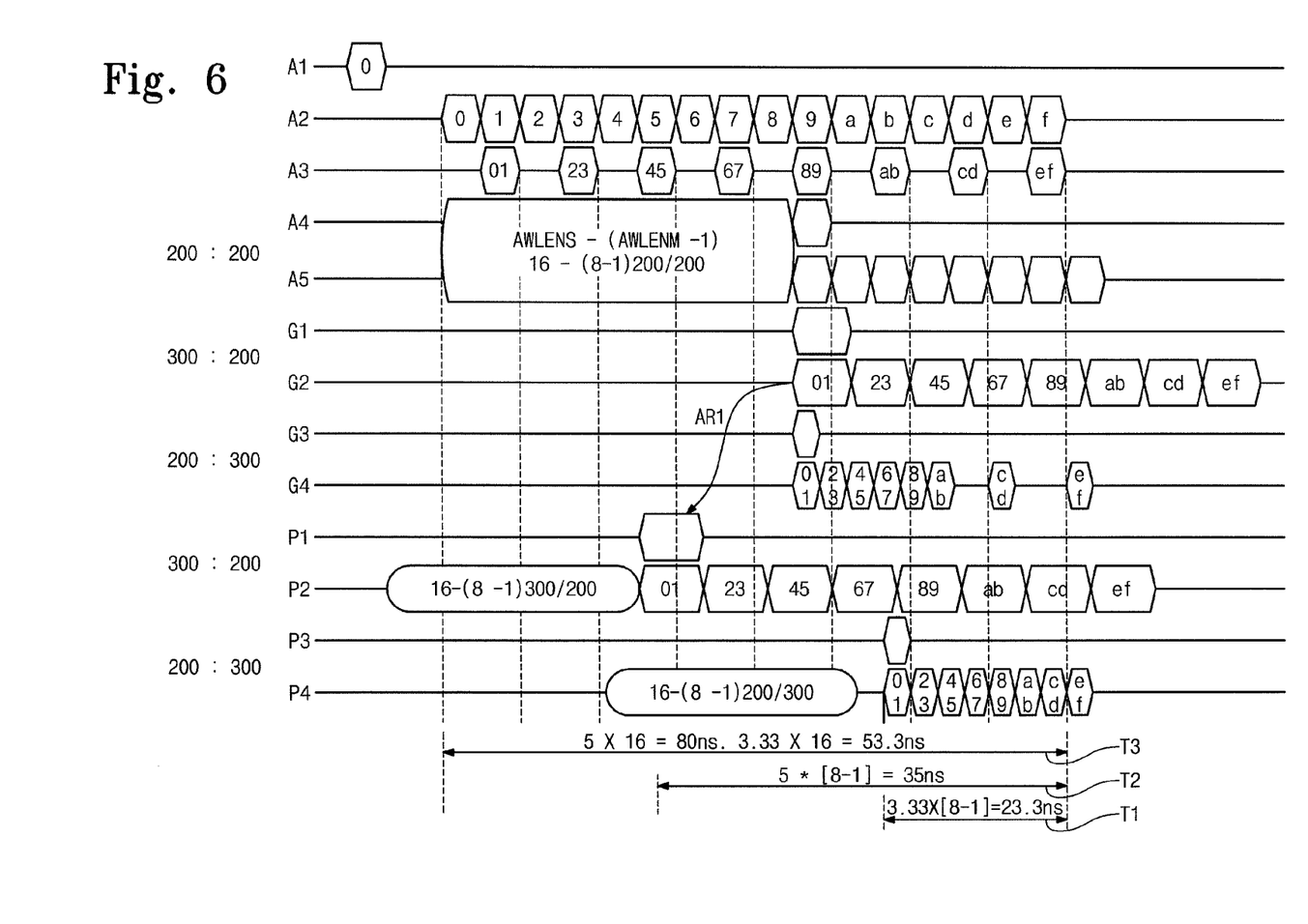
FIG. 6 is an operation timing diagram illustrating bus latency and bus utility optimization according to an exemplary embodiment of the inventive concept.

As shown in FIG. 9, when a channel compaction is performed in a burst write operation, the channel compaction may be controlled according to an operation clock adjustment table regarding the burst length and the clock ratio between a master and a slave, thereby improving bus latency (compared to G1 and G2 as shown in P1 and P2 timings of FIG. 6) or bus utility (compared to G3 and G4 as shown in P3 and P4 timings of FIG. 6).

FIG. 6 is an operation timing diagram illustrating bus latency and bus utility optimization with the asynchronous upsizer 210 of FIG. 4.

Figure 7:
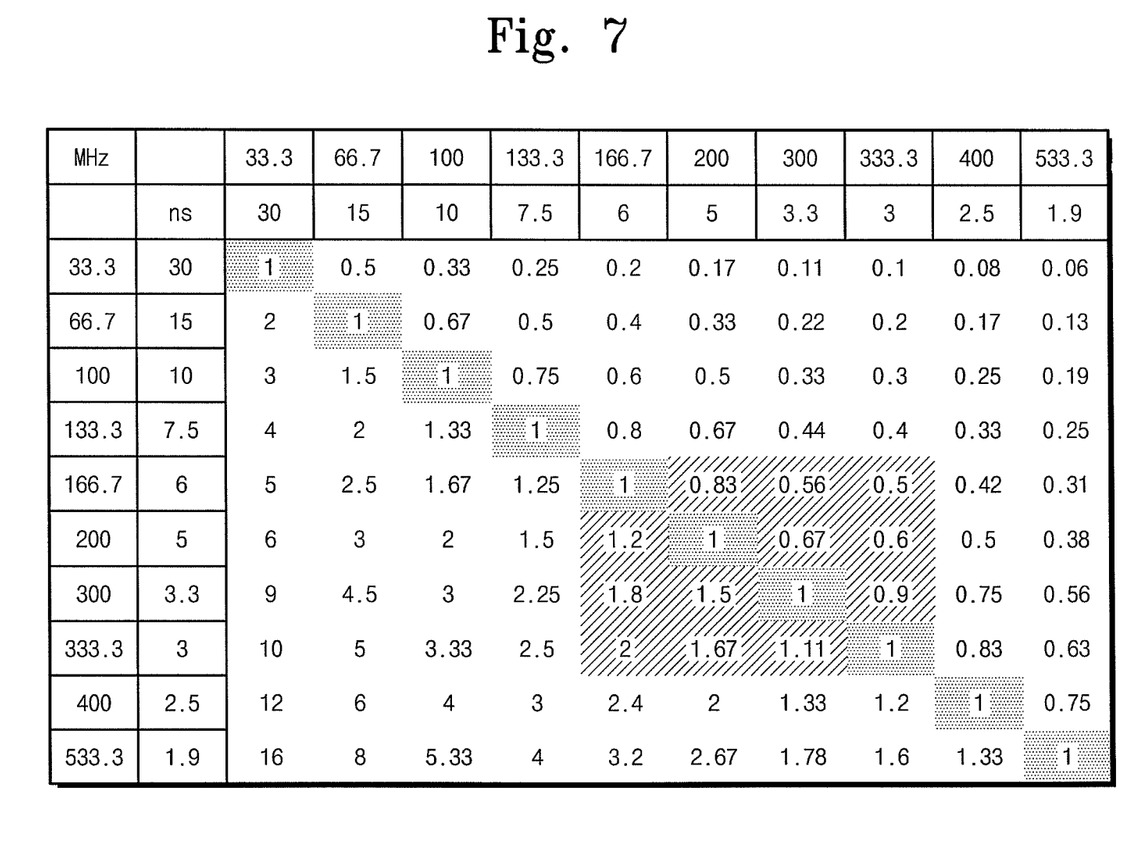
FIG. 7 is a table of ratios between the frequencies of master clocks and of slave clocks according to an exemplary embodiment of the inventive concept.

FIG. 7 is a table showing ratios between the frequencies of master clocks and slave clocks in the asynchronous upsizer 210 of FIG. 4.

Figure 8:
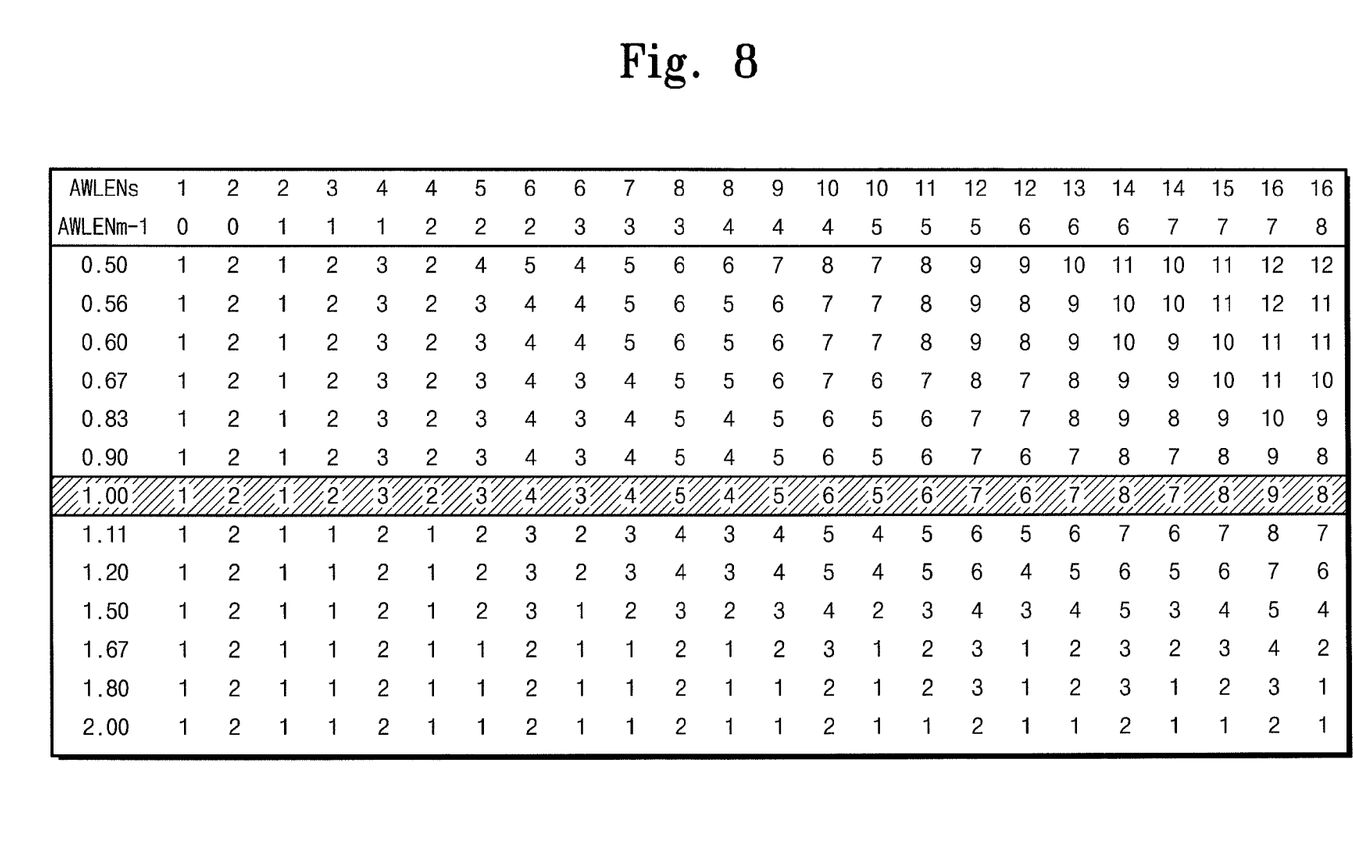
FIG. 8 is a table showing fluctuation of clocks depending upon frequency ratio and burst length of FIG. 7.

FIG. 8 is a table showing fluctuation of clocks depending upon frequency ratio and burst length of FIG. 7.

FIG. 9 is a graph illustrating the frequency ratios in the table of FIG. 8 restructured according to the distribution of fluctuation of clocks.

Referring to FIG. 6, a timing waveform A1 represents an AW request, A2 represents a write data of a 64-bit width. A3 is a write data of a 128-bit width. For example, when the frequencies of the bus master clock and the slave clock are equally about 200 MHz, for a burst write operation, the AW request may be delayed by a certain number of clocks like A4 is delayed compared to A1. Also, the write data of 128-bit width outputted from the upsizer may become delayed as shown in A5.

On the other hand, when the bus master clock is about 300 MHz, and the bus slave clock is about 200 MHz, in the synchronous upsizer 200 of FIG. 3, an AW request may be generated like G1, and a write data of 128-bit width outputted like G2 to improve the latency in the burst write operation.

When the bus master clock is about 200 MHz, and the bus slave clock is about 300 MHz, in the synchronous upsizer 200 of FIG. 3, an AW request may be generated like G3, and a write data of 128-bit width may be outputted like G4 in order to improve the bus utility in the burst write operation.

In the asynchronous upsizer 210 of FIG. 4, as shown in P1 and P2 timings, a request of a write address channel may be advanced by a predetermined number of clock cycles during the burst write operation. Specifically, when the bus master clock is about 300 MHz, and the bus slave clock is about 200 MHz, in the a synchronous upsizer 210 of FIG. 4, an AW request may be generated like P1, and a write data of 128-bit width may be outputted like P2 in order to improve the latency in the burst write operation. Since a timing waveform P2 is a data that is outputted in advance by the arrow AR1, the latency may be improved.

Also, when the bus master clock has a frequency lower than the bus slave clock, as shown in P3 and P4, a request of the write address channel may be delayed by a predetermined number of clock cycles in the burst write operation in order to perform a bus utility-optimized upsizing. Specifically, when the bus master clock is about 200 MHz, and the bus slave clock is about 300 MHz, in the upsizer as shown in FIG. 4, an AW request may be generated like P3, and a write data of 128-bit width may be outputted like P4 to improve the bus utility in the burst write operation. Although the timing waveform P4 is outputted later (by two clocks compared to G4), the bus utility can be improved due to an output at a time section T1.

Regarding a compaction in a write channel, when a write data outputted at a time section T3 is a channel compaction for latency, the write data may be outputted at a time section T2. In a channel compaction for the bus utility, since the write data is outputted at the time section T3, compaction may be made as much as a reduced section.

In a channel compaction with respect to the write channel, the degree of the request advance for latency or the request delay for bus utility may depend on the table map shown in FIG. 9. FIG. 9 may be better understood based on a thorough understanding of FIGS. 7 and 8.

Referring to FIG. 7, bus master clock frequencies are arranged on the horizontal axis in the order of increasing frequency, and slave clocks are arranged on the vertical axis in the order of increasing frequency. The symbol ns (nanosecond) indicates the period (inverse of corresponding frequencies) of the clocks. For example, a 300 MHz clock has a period about 3.3 ns.

The fields of the table of FIG. 7 represent frequency ratios. Thus, for example, in FIG. 7, a numerical value 1 is shown at the point where the frequency of the master clock of 200 MHz and the frequency of the slave clock of 200 MHz are equal. Accordingly, the numerical value (ratio) 0.67 is shown at the point where the master clock of 300 MHz and the slave clock of 200 MHz cross each other. Also, a numerical value 1.5 is shown at the point where the master clock of 200 MHz and the slave clock of 300 MHz cross each other. As shown in FIG. 8, a table of burst lengths can also be constructed and organized according to the frequency ratios.

In FIG. 8, the frequency ratio (or clock ratio) is shown along the vertical axis in increasing order. AWLENs shown on the horizontal axis of FIG. 8 indicates the length of AW, and AWLENm−1 indicates the burst length.

Referring to FIG. 8, numerical values (1, 2, 1, 2, 3, 2, 3, 4, . . . , 8) are arranged along the horizontal axis on the basis of a numerical value 1.00 on the vertical axis. The numerical values may be obtained by subtracting AW from AWLENs. Thus, 1−0=1, 2−0=2, 2−1=1, and the last numerical value 8 may be obtained by subtracting 8 from 16.

As shown in FIG. 9, a graph mapping the distribution of fluctuation of clocks t is obtained by grouping vertically equal values of the numerical table of FIG. 8 on the basis of the value 1.00 on the vertical axis. For example, a request needs not to be advanced or delayed with respect to the frequency ratio and the burst length corresponding to an area expressed as "0" in FIG. 9. Also, regarding the frequency ratio and the burst length corresponding to an area expressed as "+1", the request may be delayed by one clock for the bus utility. Regarding the frequency ratio and the burst length corresponding to an area expressed as "−1", the request may be advanced by one clock in order to improve the latency. Regarding the frequency ratio and the burst length corresponding to an area expressed as "+4", the request may be delayed by four clocks for the bus utility. Regarding the frequency ratio and the burst length corresponding to an area expressed as "−3", the request may be advanced by three clocks in order to improve the latency.

Thus, the channel compaction operation for optimizing the latency and the bus utility may be performed by the first and second asynchronous packing controllers 26 and 27 of the asynchronous upsizer 210 of FIG. 4.

According to exemplary embodiments of the inventive concept, the gate (transistor) count overhead can be reduced using an asynchronous bridge and an asynchronous upsizer that can be employed in a mobile system, and channel compaction can be more efficiently performed.

Figure 10:
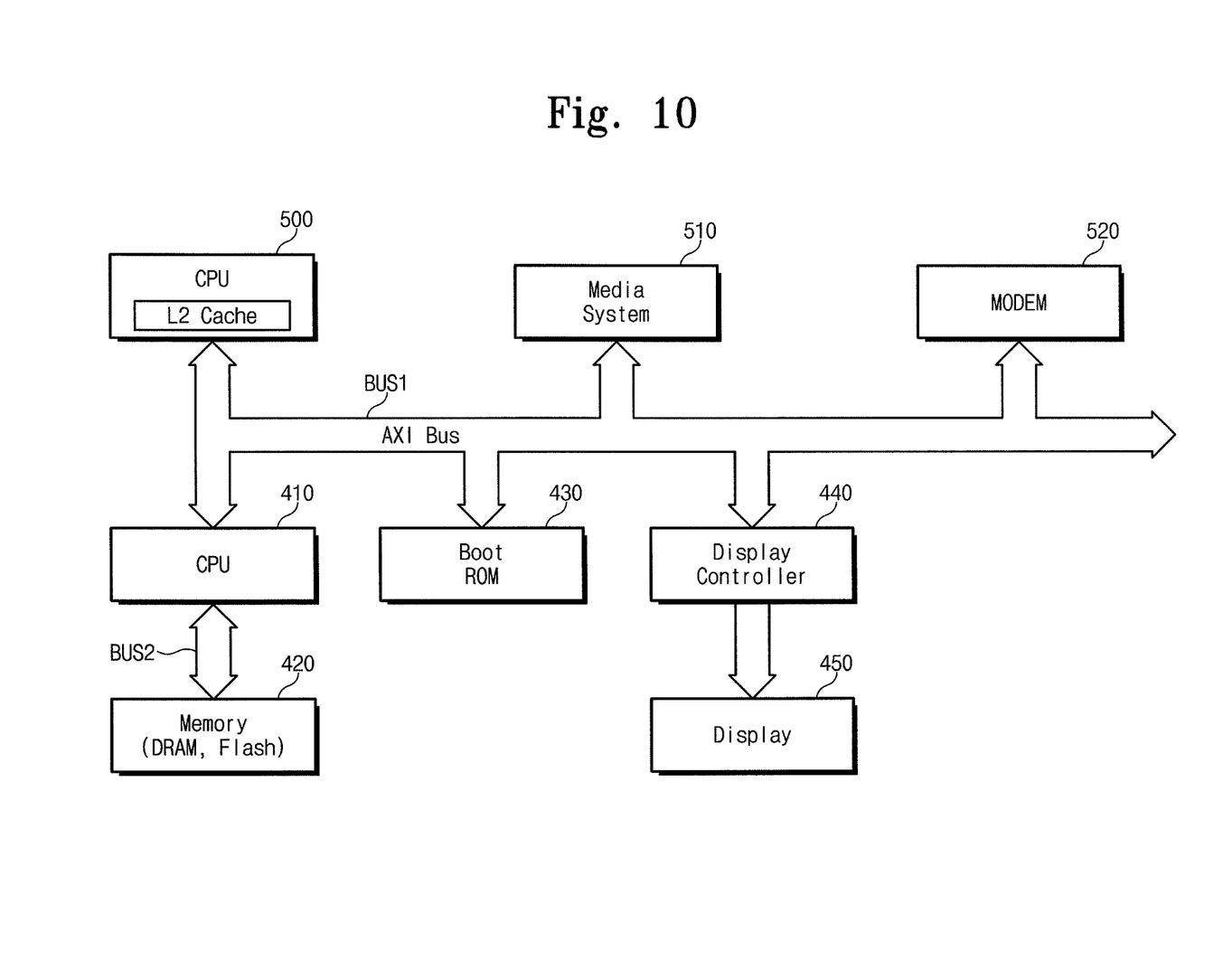
FIG. 10 is a diagram of a mobile data processing system employing an asynchronous upsizing circuit according to an embodiment of the inventive concept.

FIG. 10 is a diagram illustrating a mobile data processing system employing asynchronous upsizing circuit according to an embodiment of the inventive concept.

Referring to FIG. 10, the mobile system may include a first CPU 500 having an L2 cache, connected through an AXI bus BUS1, to a media system 510, a modem 520, a memory controller (CPU) 410, a boot ROM 430, and a display controller 440. A memory 420 such as DRAMs or flash memories may be connected to the memory controller 410. A display 450 such as LCD may be connected to the display controller 440.

In FIG. 10, BUS1 may be a CPU bus, and BUS2 may be a memory bus. The CPU 500 may include an internal level one (L1) cache in addition to an internal level 2 (L2) cache. The L1 cache (not shown) may be used to store data and/or commands frequently accessed. Similarly, the L2 cache may be used to store data and/or commands frequently accessed.

The mobile system of FIG. 10 may implement various devices such as smart phones, personal navigation devices, portable Internet devices, portable broadcasting devices, and multimedia devices.

In the mobile system of FIG. 10, the upsizer 210 of FIG. 4 may be connected between the CPU 500 and the AXI bus BUS1.

In this case, a CPU clock may be used as the first clock CLK1 of FIG. 4, and the clock of the AXI bus BUS1 may be a second clock CLK2 of FIG. 4.

During the compaction operation of the write channel, when the first clock CLK1 has a frequency higher than the second clock CLK2 (compared to the case where both frequencies are identical to each other), the circuit of FIG. 4 may advance a request of a write address channel by a predetermined number of clock cycles in a burst write operation. On the other hand, when the first clock CLK1 has a frequency lower than the second clock CLK2 (compared to the case where both frequencies are identical to each other), the circuit may delay the request of the write address channel by a predetermined number of clock cycles in the burst write operation.

As described above, according to the configuration of the asynchronous upsizing circuit 500 using the upsizer 210 of FIG. 4, the occupied area of the circuit 500 integrated on a chip can be reduced by the sharing of the buffers, thereby reducing the cost necessary for implementation of the circuit. Also, during a channel compaction in an asynchronous packer, latency or bus utility can be optimized, thereby improving the operation performance.

Accordingly, when the asynchronous upsizing circuit 500 using the upsizer 210 of FIG. 4 is employed in the SoC of FIG. 10, the manufacturing cost of a data processing system can be reduced, and the operation performance of the SoC can be improved.

Although sharing of buffers and channel compaction have been mainly described in the above exemplary embodiments of the inventive concept, without being limited thereto, the embodiments of the inventive concept may also be extensively applied to any data processing system in which a gate (transistor) count overhead or channel compaction inefficiency may otherwise occur.

The number of the processors may be increased to more than two in the mobile system to which the embodiments of the inventive concept are applied. Examples of the processors (CPU 500, CPU 410) may include microprocessors, CPUs, digital signal processors, microcontrollers, reduced command set computers, and complex command set computers.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description of exemplary embodiments.

What is claimed is:

1. An asynchronous upsizing circuit in a data processing system comprising:
    an asynchronous packer comprising:
        a write buffer used for an asynchronous bridge and for upsizing and buffering a write channel data; and
        first and second asynchronous packing controllers controlling channel compaction according to first and second clocks, respectively, regarding the write channel data inputted/outputted to/from the write buffer during a burst write operation; and
    an asynchronous unpacker comprising:
        a read buffer used for an asynchronous bridge and for upsizing and buffering a read channel data; and
        first and second asynchronous unpacking controllers controlling channel compaction according to the first and second clocks, respectively, regarding the read channel data inputted/outputted to/from the read buffer during a burst read operation.

2. The asynchronous upsizing circuit of claim 1, wherein the write buffer comprises memories assigned to a write address channel, a write data channel, and a write response channel, respectively.

3. The asynchronous upsizing circuit of claim 2, wherein, while the first clock has a frequency higher than a frequency of the second clock, a request of the write address channel is performed in advance by a predetermined number of clock cycles during the burst write operation in order to optimize latency while upsizing.

4. The asynchronous upsizing circuit of claim 2, wherein, while the frequency of the first clock is lower than the frequency of the second clock, a request of the write address channel is delayed by a predetermined number of clock cycles during the burst write operation to optimize bus utility while upsizing.

5. The asynchronous upsizing circuit of claim 2, wherein the memories are First-In First-Out (FIFO) memories.

6. The asynchronous upsizing circuit of claim 2, wherein the first clock is a bus-master clock, and the second clock is an Advanced eXetensible Interface (AXI) bus clock.

7. The asynchronous upsizing circuit of claim 6, wherein the bus-master clock is a clock provided from a memory controller.

8. The asynchronous upsizing circuit of claim 7, wherein the asynchronous packer performs an asynchronous packing on the write channel data, and the asynchronous unpacker performs an asynchronous unpacking on the read channel data.

9. The asynchronous upsizing circuit of claim 1, wherein the read buffer comprises memories assigned to a read address channel and a read data channel, respectively.

10. The asynchronous upsizing circuit of claim 9, wherein the memories are First-In First-Out (FIFO) memories.

11. An asynchronous upsizing circuit in a data processing system comprising:
    an asynchronous packer comprising:
        first, second and third asynchronous memories commonly used for an asynchronous bridge and an upsizing and buffering a write channel data
        and first and second asynchronous packing controllers controlling channel compaction according to a bus-master clock and a bus-slave clock, respectively, regarding the write channel data inputted/outputted to/from the first, second and third asynchronous memories during a burst write operation; and
    an asynchronous unpacker comprising:
        fourth and fifth asynchronous memories commonly used for an asynchronous bridge and an upsizing and buffering a read channel data; and
        first and second asynchronous unpacking controllers controlling channel compaction according to the bus-master clock and the bus-slave clock, respectively, regarding the read channel data inputted/outputted to/from the fourth and fifth asynchronous memories during a burst read operation.

12. The asynchronous upsizing circuit of claim 11, wherein the bus-master clock is a Central Processing Unit (CPU) clock, and the bus-slave clock is an AXI bus clock.

13. The asynchronous upsizing circuit of claim 11, wherein the first asynchronous memory, the second asynchronous memory, and the third asynchronous memory are assigned to a write address channel, a write data channel, and a write response channel, respectively.

14. The asynchronous upsizing circuit of claim 11, wherein the fourth asynchronous memory and the fifth asynchronous memory are assigned to a read address channel and a write data channel, respectively.

15. The asynchronous upsizing circuit of claim 11, wherein, while the frequency of the bus-master clock is higher than the frequency of the slave clock, a request of the write address channel is advanced by a predetermined number of clock cycles during the burst write operation to optimize latency while upsizing.

16. The asynchronous upsizing circuit of claim 11, wherein, while the frequency of the bus-master clock is lower than the frequency of the bus-slave clock, a request of the write address channel is delayed by a predetermined number of clock cycles during the burst write operation to optimize bus utility while upsizing.

17. A data processing system comprising:
a Central Processing Unit (CPU) including a Level2 (L2) cache controller;
an asynchronous upsizing circuit connected between the CPU and a system bus, comprising:
an asynchronous packer comprising:
a write buffer used for an asynchronous bridge and for upsizing and for buffering a write channel data; and
first and second asynchronous packing controllers controlling channel compaction according to first and second clocks, respectively, regarding the write channel data inputted/outputted to/from the write buffer during a burst write operation,
and an asynchronous unpacker comprising:
a read buffer used for an asynchronous bridge and for upsizing and for buffering a read channel data; and
first and second asynchronous unpacking controllers controlling channel compaction according to the first and second clocks, respectively, regarding the read channel data inputted/outputted to/from the read buffer during a burst read operation.

18. The data processing system of claim 17, further comprising:
a display-related functional block integrated with the system bus,
wherein the asynchronous upsizing circuit is connected between the CPU and the system bus via the L2 cache controller.

19. The data processing system of claim 18, wherein the display-related functional block is an pre-designed IP for a mobile system.

20. An asynchronous packing method in a data processing system including a write buffer used for an asynchronous bridge and for upsizing and for buffering a write channel data and including first and second asynchronous packing controllers controlling channel compaction according to a bus-master clock and a bus-slave clock, respectively, regarding the write channel data inputted/outputted to/from the write buffer during a burst write operation, the method comprising:
advancing a request of a write address channel by a predetermined number of clock cycles during the burst write operation while the frequency of the bus-master clock is higher than the frequency of the bus-slave clock; and
delaying the request of the write address channel by a predetermined number of clock cycles during the burst write operation while the frequency of the bus-master clock is lower than the frequency of the bus-slave clock.

* * * * *